US006837816B2

(12) United States Patent
Tsai et al.

(10) Patent No.: US 6,837,816 B2
(45) Date of Patent: *Jan. 4, 2005

(54) MOTOR INTEGRATED PARALLEL HYBRID TRANSMISSION

(76) Inventors: Lung-Wen Tsai, 7350 Via Vista Dr., Riverside, CA (US) 92506; Gregory A. Schultz, 4207 Rock Run Rd., Havre de Grace, MD (US) 21078

( * ) Notice: Subject to any disclaimer, the term of this patent is extended or adjusted under 35 U.S.C. 154(b) by 3 days.

This patent is subject to a terminal disclaimer.

(21) Appl. No.: 10/361,439

(22) Filed: Feb. 10, 2003

(65) Prior Publication Data

US 2003/0199352 A1 Oct. 23, 2003

Related U.S. Application Data

(63) Continuation-in-part of application No. 09/635,315, filed on Aug. 9, 2000, now Pat. No. 6,592,484.
(60) Provisional application No. 60/355,012, filed on Feb. 8, 2002, provisional application No. 60/188,662, filed on Mar. 10, 2000, provisional application No. 60/148,826, filed on Aug. 13, 1999, and provisional application No. 60/147,915, filed on Aug. 9, 1999.

(51) Int. Cl.[7] ............................ F16H 3/72; F16H 37/06; B62D 11/00; B62D 11/02
(52) U.S. Cl. ............................ 475/5; 475/8; 180/65.2; 180/65.3
(58) Field of Search ............... 475/5, 8; 180/65.2–65.3, 180/65.4, 65.6–65.7

(56) References Cited

U.S. PATENT DOCUMENTS

| | | | | |
|---|---|---|---|---|
| 3,566,717 A | * | 3/1971 | Berman et al. ................ 477/3 |
| 3,623,568 A | * | 11/1971 | Mori ............................ 180/15 |
| 3,732,751 A | * | 5/1973 | Berman et al. ................ 475/2 |
| 3,861,484 A | * | 1/1975 | Joslin ........................ 180/65.2 |
| 5,285,111 A | * | 2/1994 | Sherman ..................... 290/4 C |
| 5,337,848 A | * | 8/1994 | Bader ........................ 180/65.2 |
| 5,343,970 A | * | 9/1994 | Severinsky ................. 180/65.2 |
| 5,433,282 A | * | 7/1995 | Moroto et al. ............. 180/65.2 |
| 5,492,189 A | * | 2/1996 | Kriegler et al. ............ 180/65.2 |
| 5,558,173 A | * | 9/1996 | Sherman ..................... 180/53.8 |
| 5,558,175 A | * | 9/1996 | Sherman .................... 180/65.2 |
| 5,558,588 A | * | 9/1996 | Schmidt ......................... 475/5 |
| 5,558,589 A | * | 9/1996 | Schmidt ......................... 475/5 |
| 5,558,595 A | * | 9/1996 | Schmidt et al. ................ 477/3 |
| 5,571,058 A | * | 11/1996 | Schmidt ......................... 475/5 |
| 5,577,973 A | * | 11/1996 | Schmidt ......................... 475/5 |
| 5,643,119 A | * | 7/1997 | Yamaguchi et al. ............ 475/5 |
| 5,713,425 A | * | 2/1998 | Buschhaus et al. ........ 180/65.2 |
| 5,730,675 A | * | 3/1998 | Yamaguchi ..................... 475/2 |
| 5,730,676 A | * | 3/1998 | Schmidt ......................... 475/5 |
| 5,789,823 A | * | 8/1998 | Sherman ....................... 290/47 |
| 5,846,155 A | * | 12/1998 | Taniguchi et al. .............. 477/2 |
| 5,911,642 A | * | 6/1999 | Andres et al. .................. 475/2 |
| 5,931,757 A | * | 8/1999 | Schmidt ......................... 475/2 |
| 5,935,035 A | * | 8/1999 | Schmidt ......................... 475/5 |
| 5,984,034 A | * | 11/1999 | Morisawa et al. ......... 180/65.2 |
| 6,010,422 A | * | 1/2000 | Garnett et al. ................. 475/5 |
| 6,024,182 A | * | 2/2000 | Hamada et al. ............ 180/6.28 |
| 6,090,005 A | * | 7/2000 | Schmidt et al. ................ 475/5 |
| 6,258,006 B1 | * | 7/2001 | Hanyu et al. ................... 477/5 |
| 6,592,484 B1 | * | 7/2003 | Tsai et al. ....................... 475/5 |

* cited by examiner

Primary Examiner—Tisha Lewis
(74) Attorney, Agent, or Firm—Whiteford, Taylor & Preston, LLP; Gregory M. Stone; Jeffrey C. Maynard

(57) ABSTRACT

A motor-integrated transmission mechanism for use in parallel hybrid electric vehicles. The transmission can provide five basic modes of operation that can be further classified into sixteen sub-modes: one electric motor mode, four engine modes, four engine/charge modes, three power modes and four regenerative braking modes. Each of these sub-modes can be grouped into like clutching conditions, providing the functional appearance of a conventional 4-speed automatic transmission, with electric launch, engine-only, engine/charge, power-assist, and regeneration capability. CVT capability is provided with one of the engine/charge modes. The transmission can be incorporated in front-wheel drive and in rear-wheel drive vehicles.

30 Claims, 1 Drawing Sheet

MOTOR INTEGRATED PARALLEL HYBRID TRANSMISSION

CROSS-REFERENCE TO RELATED APPLICATIONS

The present application is based upon and gains priority from U.S. Provisional Patent Application Ser. No. 60/355,012, filed Feb. 8, 2002, by the inventors herein and entitled "A Motor Integrated Parallel Hybrid Transmission"; and is a Continuation-In-Part of U.S. patent application Ser. No. 09/635,315, filed Aug. 9, 2000 now U.S. Pat. No. 6,592,484 by the inventors herein and entitled "Transmission Gearbox for Parallel Hybrid Electric Vehicles," which application is based upon and gains priority from U.S. Provisional Patent Application Ser. No. 60/147,915, filed Aug. 9, 1999 by one of the inventors herein and entitled "A Transmission Gearbox for Parallel Hybrid Electric Vehicles"; and is also based upon and gains priority front U.S. Provisional Application Ser. No. 60/148,826, filed Aug. 13, 1999 by one of the inventors herein and entitled "A Transmission Gearbox for Parallel Hybrid Electric Vehicles"; and is likewise also based upon and gains priority from U.S. Provisional Application Ser. No. 60/188,662, filed Mar. 10, 2000, entitled "A Transmission Gearbox for Parallel Hybrid Electric Vehicles."

BACKGROUND OF THE INVENTION

1. Field of the Invention

The invention disclosed herein relates generally to parallel hybrid electric vehicle (HEV) transmissions, and more particularly to parallel hybrid electric vehicle transmissions capable of providing one- or two-degree-of-freedom operation in order to couple and transmit torque from two power sources to the drive wheels of the automobile, or to split the torque from one power source into two parts, one for driving the automobile and the other for charging the vehicle batteries.

2. Description of the Background

Internal combustion engines are widely used for driving passenger cars. Typically, the size of an engine used in a vehicle is several times greater than the average power requirement of the vehicle in order to meet various operating conditions. As a result, the engine cannot run at its optimal operating condition most of the time which leads to poor fuel economy and emissions. This problem is particularly important in large cities where stop-and-go driving is common and pollution is a major problem.

One approach to reduce pollutants is to utilize electric vehicles. In an electric vehicle, an electric motor derives its power from a battery pack to drive the vehicle. The batteries are charged by an external power source when the vehicle is off duty. However, electric vehicles suffer the problems of limited driving range, typically around 200 miles, insufficient acceleration and hill climbing performance, and prolonged battery charging time.

Another approach is to employ hybrid vehicles. There are two types of hybrid vehicles, namely, series hybrid and parallel hybrid. In a series hybrid, an electric motor converts chemical energy stored in a battery pack into mechanical power to drive the vehicle whereas an engine is used to drive a generator for charging the batteries. Power is transmitted from the engine to the electric generator, the battery pack, and the electric motor, and then to the wheels. This arrangement permits the engine to run near its optimal operating condition on demand. Hence, the problems of limited driving range and prolonged battery charging time can be avoided. In a parallel hybrid, two or more power sources such as an engine and an electric motor are used to drive the vehicle simultaneously. Through the use of a non-conventional transmission and an electronic control unit, the electric motor can sometimes be converted into a generator for charging the batteries. In this regard, a parallel hybrid provides a more direct transfer of energy from the engine to the driving wheels. In addition, the size of the electric motor can be much smaller than that of a series hybrid, and there is no need for a separate generator. Hence, a parallel hybrid is more efficient and more economical than a series hybrid.

Attempts have been made in the past to provide parallel hybrid electric vehicle transmissions, but with limited success. For example, U.S. Pat. No. 5,577,973 to Schmidt describes a two-degree-of-freedom hybrid transmission in which a compound planetary gear set having two planetary gear subsets is provided, with two gear members of each subset being conjoined with two gear members of the opposing subset. This arrangement allows the electric motor to supplement the torque supplied by the heat engine to enable a two-degree-of-freedom transmission, but fails to enable engine-only or motor-only operation, thus limiting the utility of the transmission to one having two modes of forward driving operation.

Likewise, U.S. Pat. No. 5,558,175 to Sherman describes a hybrid transmission comprising two compound planetary gear train arrangements, one for combining torque outputs from an internal combustion engine with the torque outputs from an electric motor, and the other for providing a multi-range transmission capability. Thus, the Sherman '175 system requires two separate planetary gear train assemblies in order to accomplish the combined functions of torque combination with multi-speed capability.

It would therefore be advantageous to provide a hybrid electric vehicle transmission which combines the features of torque combination from a heat engine and electric motor and multi-speed capability in a single compound planetary gear train assembly, while enabling combined engine and motor operation, engine-only operation, or motor-only operation as the need arises to meet varying torque and engine efficiency requirements. It would be even more advantageous to provide these features in a configuration where a single motor/generator unit can be integrated coaxially with the planetary gear set.

SUMMARY OF THE INVENTION

It is, therefore, an object of the present invention to provide a parallel hybrid transmission which avoids the disadvantages of the prior art.

It is another object of the present invention to provide a parallel hybrid transmission having the ability to sum torque from two power sources and transmit the combined torque to the vehicle wheels.

It is another object of the present invention to provide a parallel hybrid transmission operable by a single heat engine and a single electric motor/generator unit.

It is yet another object of the present invention to provide a parallel hybrid transmission that enables selective operation of engine-only, motor-only, and combined engine and motor torque transmission to an output shaft.

It is yet another object of the present invention to provide a parallel hybrid transmission having the ability to split torque from a heat engine such that a portion of the torque derived from the heat engine is used to power a generator that charges the vehicle batteries, while the remaining portion of the torque derived from the heat engine is transmitted to the vehicle wheels.

It is still yet another object of the present invention to provide a parallel hybrid transmission having the ability to operate two power sources individually, and to control such power sources independently from one another.

It is still even yet another object of the present invention to provide a parallel hybrid transmission having the ability to operate as a continuous variable transmission.

It is still yet another object of the present invention to provide a parallel hybrid transmission having regenerative braking capability.

It is even yet another object of the present invention to provide a parallel hybrid transmission having a single motor/generator unit mounted coaxially with a planetary gear set.

It is even yet another object of the present invention to provide a parallel hybrid transmission exhibiting small mechanical and electrical losses.

It is still even yet another object of the present invention to provide a parallel hybrid transmission of reliable and simplified design over prior art transmissions.

In accordance with the above objects, a novel parallel hybrid transmission is provided comprising a compound planetary gear set, an engine, an engine input shaft, a combined electric motor and generator assembly, a motor input shaft, an output shaft, and four torque transfer devices. In a preferred embodiment of the invention, the four torque transfer devices comprise two multi-disk clutches and two band clutches. The compound planetary gear set comprises two planetary gear trains that conjoin two gear members from each gear train. In a preferred embodiment of the invention, the two planetary gear trains share a compound sun gear and conjoin the ring gear of the input planetary gear train with the planet carrier of the output planetary gear train. Also in a preferred embodiment of the invention, the combined electric motor and generator assembly is integrated coaxially with the compound planetary gear set, with the central rotational axes of the motor and planetary gear set aligning with the rotational axes of the engine input shaft and output shaft. Through the use of the torque transfer devices, the engine input shaft may be selectively coupled to various members of the compound planetary gear set and various members of the compound planetary gear set may be selectively grounded to the transmission case in order to provide 16 operational modes, namely: an electric motor driving mode for moving the vehicle from a standstill and for low speed driving in city traffic; three power modes which combine the torque provided from the engine and the motor; three engine charge modes which use power from the engine to simultaneously drive the vehicle and charge the batteries; a continuous variable transmission/charging mode which uses power from the engine to simultaneously drive the vehicle and charge the batteries while enabling continuous variable transmission through regulation of the speed of the generator; four engine modes which power the vehicle directly from the heat engine with no power assist from the motor for use in highway cruising conditions; and four regenerative modes experienced during vehicle braking in which the electric motor is operated as a generator to charge the batteries.

Thus, the combination of the torque transfer devices and compound planetary gear train of the instant invention provide increased versatility of a hybrid vehicle transmission over prior art hybrid vehicle transmissions, while maintaining a simplified, reliable transmission construction operable through engine-only, motor-only, and combined engine and motor torque transmission to the transmission output shaft.

BRIEF DESCRIPTION OF THE DRAWINGS

Other objects, features, and advantages of the present invention will become more apparent from the following detailed description of the preferred embodiment and certain modifications thereof when taken together with the accompanying drawing in which.

DETAILED DESCRIPTION OF THE PREFERRED EMBODIMENTS

Figure 1:
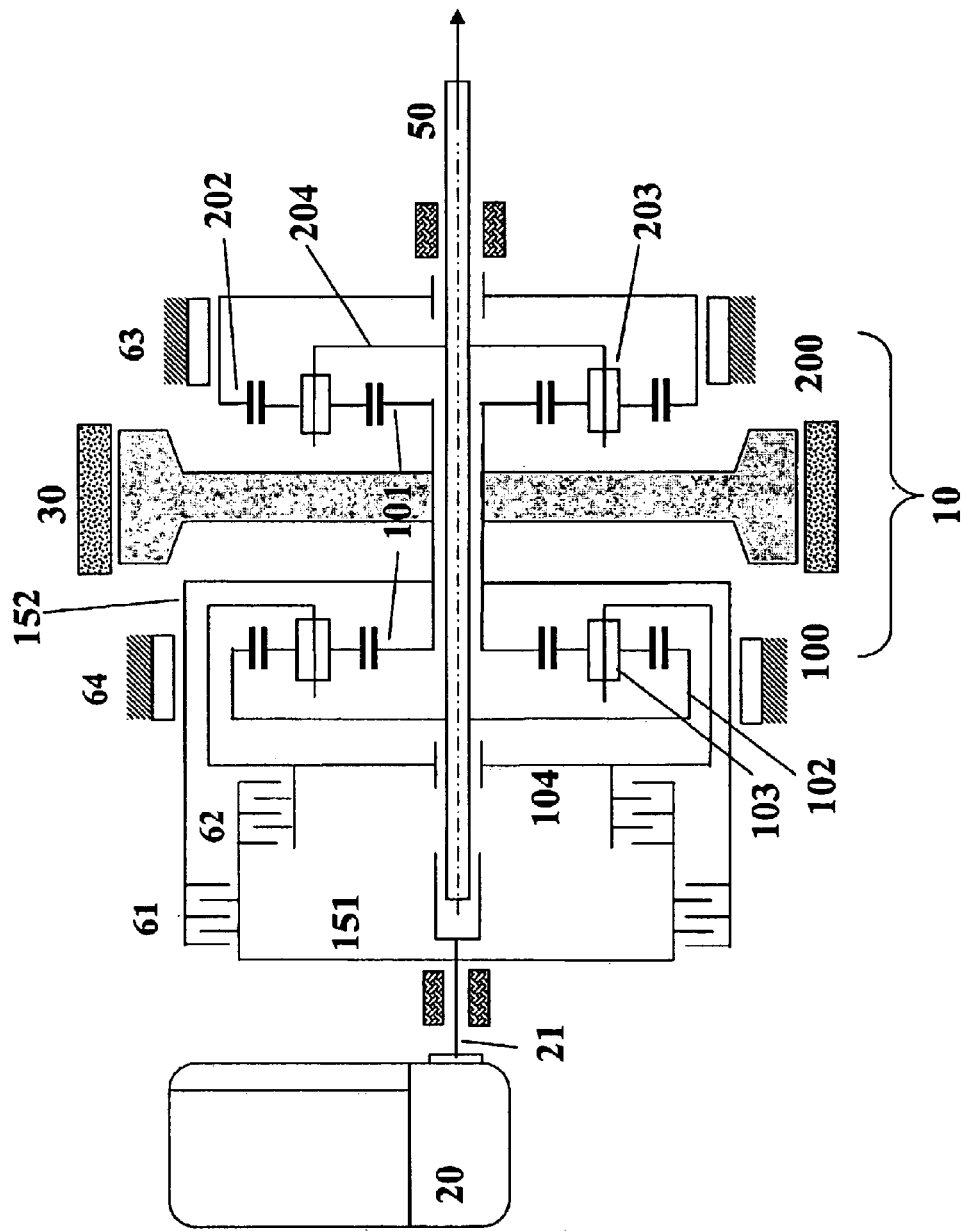
FIG. 1 is a schematic representation of a motor integrated parallel hybrid electric vehicle transmission of the instant invention.

As shown in the schematic representation of FIG. 1, the parallel hybrid electric vehicle transmission of the instant invention comprises a compound planetary gear set (shown generally at 10), an engine 20, an engine input shaft 21, a combined electric motor and generator 30, an output shaft 50, and four torque transfer devices 61, 62, 63, and 64. Torque transfer devices 61 and 62 preferably comprise multi-disk clutches, and torque transfer devices 63 and 64 preferably comprise band clutches. However, other similarly configured torque transfer devices, such as one-way clutches, may likewise be used without departing from the spirit and scope of the instant invention.

Compound planetary gear set 10 more particularly comprises an input planetary gear train (shown generally at 100) and an output planetary gear train (shown generally at 200). Each of planetary gear trains 100 and 200 share a compound sun gear 101. Input planetary gear train 100 further comprises a ring gear 102 and a plurality of planetary gears 103. Likewise, output planetary gear train 200 further comprises a ring gear 202 and a plurality of planetary gears 203. The output shaft 50 interconnects ring gear 102 of input planetary gear train 100 with the carrier 204 of planetary gears 203 of output planetary gear train 200. Electric motor 30 is integrated coaxially with compound sun gear 101.

Engine input shaft 21 is affixed to hub 151, which may in turn be operatively connected to the compound planetary gear train 10 by engaging either or both of multi-disk clutches 61 and 62. When clutch 61 is engaged, engine input shaft 21 is coupled to the compounded sun gear 101 of input planetary gear train 100 and output planetary gear train 200 through hub 152. Likewise, when clutch 62 is engaged, engine input shaft 21 is coupled to carrier 104 of input planetary gear train 100. Band clutches 63 and 64 are used to ground ring gear 202 and sun gear 101 to the transmission case (not shown), and can be used to reduce the mobility of the transmission from the two degree-of-freedom to one degree-of-freedom operation.

More particulary, sixteen useful operational modes are available from the parallel hybrid transmission of the instant invention using different combinations of the four clutches and operating the electric motor as either a motor or generator or allowing it to freewheel in the off condition. The sixteen useful modes of operation may be summarized by the following Table 1, and are discussed in greater detail below:

TABLE 1

Operational modes.

| No. | Operation Mode | Clutches Engaged | | | | Motor Operating Condition |
|---|---|---|---|---|---|---|
| | | 61 | 62 | 63 | 64 | |
| 1 | Motor-only | | | X | | Motor |
| 2 | Power 1 | X | | X | | Motor |
| 3 | Power 2 | | X | X | | Motor |
| 4 | Power 3 | X | X | | | Motor |
| 5 | Engine Charge 1 | X | | X | | Generator |
| 6 | Engine Charge 2 | | X | X | | Generator |
| 7 | Engine Charge 3 | X | X | | | Generator |
| 8 | Continuous variable transmission / Charging | | X | | | Generator |
| 9 | Engine-only 1 | X | | X | | Free Wheeling |
| 10 | Engine-only 2 | | X | X | | Free Wheeling |
| 11 | Engine-only 3 | X | X | | | Free Wheeling |
| 12 | Engine-only 4 | | X | | X | Stationary |
| 13 | Regenerative Braking 0 | | | X | | Generator |
| 14 | Regenerative Braking 1 | X | | X | | Generator |
| 15 | Regenerative Braking 2 | | X | X | | Generator |
| 16 | Regenerative Braking 3 | X | X | | | Generator |

The first mode of operation of the parallel hybrid transmission of the instant invention is motor-only mode in which the electric motor provides all of the power to drive the vehicle, in the forward or reverse direction, at a low-speed gear reduction. The motor-only mode is used to initially move the vehicle from a standstill and for low speed driving in city traffic. Band clutch member 63 is the only clutch member engaged, grounding ring gear 202 to the transmission case. As a result, the transmission becomes a single degree-of-freedom transmission operable solely through the torque produced by electric motor 30. As shown, power is directed from electric motor 30, sun gear 101, and planetary gears 203 (and their carrier 204) to output shaft 50. Ring gear 202 serves as a reaction member. In this operational mode, the input planetary gear train spins freely.

Another feature of the motor-only mode of operation of the transmission of the instant invention is that a vehicle operator may start engine 20 without an electric starter, as is traditionally required. When operating in motor-only mode, the vehicle operator need only engage clutch 61, and thus shift from the motor-only mode to the first combined engine and motor mode, which process will in turn pull the engine up to operating speed as would a traditional, separate electric starter.

The next group of modes of operation of the parallel hybrid transmission of the instant invention are power-summing combination modes which combine torque from the engine and motor to drive the vehicle, at different gear reductions. The power-summing combination modes are used for maximum acceleration or hill climbing.

In the first power-summing combination mode, band clutch 63 and multi-disk clutch 61 are engaged, and all other clutches are disengaged. Ring gear 202 is grounded to the transmission case and serves as a reaction member. With multi-disk clutch 61 engaged, torque from the engine enters through sun gear 101 to output planetary gears 203 and carrier 204 to output shaft 50. Likewise, torque from the motor enters through sun gear 101 to output planetary gears 203 and carrier 204 to output shaft 50. Thus, the torque from the engine and motor are summed at the sun gear and directed to output shaft 50.

In the second power-summing combination mode, multi-disk clutch 62 is engaged, along with band clutch 63, and all others are disengaged. With clutch 62 engaged, torque from the engine enters from shaft 21 through input carrier 104, to planetary gears 103, where it is split between the sun gear 101 and the ring gear 102. The portion of engine power entering sun gear 101 is combined with the motor power at sun gear 101. The combined torque on the sun gear enters planetary gears 203 and carrier 204 to the output shaft 50. The remainder of the engine power entering ring gear 102 is added to the other combined engine and motor power on the output shaft 50 to power the vehicle, at less gear reduction than the first combined power-summing mode.

In the third power-summing combination mode, multi-disk clutches 61 and 62 are engaged and all other clutches are disengaged. Under this condition, the input and output planetary gear trains lock together and rotate as a single unit, providing a direct drive power-summing mode. Torque from the engine is transferred from hub 151 to both input planetary gear carrier 104 and hub 152. From planetary gear carrier 104, torque is transferred to planetary gears 103, and in turn to ring gear 102 and sun gear 101, and ultimately to output shaft 50. Torque from hub 152 is likewise transferred through sun gear 101, ultimately to output shaft 50. Finally, motor torque is also transferred through sun gear to output shaft 50. The engine torque and motor torque are summed in the locked planetary gear set 10 to power the output shaft 50. Under this configuration, the engine and motor rotate at the same speed.

The next group of modes of operation of the parallel hybrid transmission of the instant invention are engine-only modes which are utilized during highway cruising conditions in which it is highly desirable to power the vehicle directly from the heat engine with no power assist from the motor. The varying clutch arrangements made available by the configuration of the instant invention offer four distinct engine-only modes, namely, two reduction modes, one direct drive mode, and one overdrive gear ratio mode.

In the first reduction gear ratio engine-only mode, multi-disk clutch 61 and band clutch 63 are engaged, and the motor is free-wheeling in the off condition. With band clutch 63 engaged, ring gear 202 serves as a reaction member, and the input shaft 21 is coupled to the output planetary gear train 200. The electric motor is switched to a neutral condition. In this configuration, engine torque is transferred through hub 151, then hub 152, through sun gear 101, to output planetary gear train carrier 204, to output shaft 50.

In the second reduction gear ratio engine-only mode, clutches 62 and 63 are engaged and all others are disengaged. With clutch 62 engaged, torque from the engine enters from shaft 21 through input carrier 104, to planetary gears 103, where it is split between the sun gear 101 and the ring gear 102. The motor 30 is free-wheeling in the off condition. The portion of engine power entering sun gear 101 is transferred through planetary gears 203 to output shaft 50. The remainder of the engine power entering ring gear 102 is added to the other engine power on output shaft 50 to power the vehicle, at less gear reduction than the first engine-only mode.

In the direct drive engine-only mode, multi-disk clutches 61 and 62 are engaged, and all remaining clutches are disengaged. The motor is allowed to free-wheel in the off condition. Under this condition, the input and output planetary gear trains lock together and rotate as a single unit, providing a direct drive engine-only mode. Torque from the engine is transferred from hub 151 to both input planetary gear carrier 104 and hub 152. From planetary gear carrier 104, torque is transferred to planetary gears 103, and in turn to ring gear 102 and sun gear 101, and ultimately to output shaft 50. Torque from hub 152 is likewise transferred through sun gear 101, ultimately to output shaft 50.

In the overdrive engine-only mode, multi-disk clutch 62 and band clutch 64 are engaged, and all other clutches are disengaged. Prevented from rotating due to band clutch 64, sun gear 101 becomes the reaction member, and the output planetary gear train carries no load. Engine torque is transferred through hub 151, input planetary gear train carrier 104, planetary gears 103, ring gear 102, to output shaft 50. The next mode of operation of the parallel hybrid transmission of the instant invention is engine charging modes which enable the engine to power the vehicle and power the electric motor generator assembly simultaneously. The generator in turn charges the vehicle batteries when the battery state-of-charge is low and the power requirement for cruising is low. The varying clutch arrangements made available by the configuration of the instant invention offer four distinct engine charge modes, namely two reduction modes, one direct drive mode, and one continuously variable transmission (CVT) mode.

In the first reduction engine charging mode, band clutch 63 and multi-disk clutch 61 are engaged, and all other clutches are disengaged. Ring gear 202 is grounded to the transmission case and serves as a reaction member. The power flow in this mode is similar to that of the first reduction power-summing mode, except motor 30 is operated as a generator to charge vehicle batteries or power vehicle accessories.

In the second reduction engine charging mode, multi-disk clutch 62 is engaged, along with band clutch 63, and all others are disengaged. Ring gear 202 is grounded to the transmission case and serves as a reaction member. The power flow in this mode is similar to that of the second power-summing mode, except motor 30 is operated as a generator to charge vehicle batteries or power vehicle accessories.

In the direct-drive engine charging mode, multi-disk clutches 61 and 62 are engaged, and all remaining clutches are disengaged. The power flow in this mode is similar to that of the direct-drive power-summing mode, except motor 30 is operated as a generator to charge vehicle batteries or power vehicle accessories.

In the continuously variable transmission engine charging mode, multi-disk clutch 62 is engaged, and torque from the engine is transferred through hub 151 and input planetary gear train carrier 104 to input planetary gears 103, where the torque is split. Most of the torque is used to drive the vehicle as it is transferred from planetary gears 103 through ring gear 102, and to output shaft 50, while the remainder is used to power the motor/generator for charging the batteries and powering vehicle electric accessories through sun gear 101. For this operating mode, the motor is operated as a generator. For a given output shaft speed, the engine can be operated at a speed yielding peak efficiency while the vehicle speed is regulated by varying the speed of the generator. In this regard, the transmission functions as a continuous variable transmission.

As indicated in Table 1 above, four regenerative braking modes are also made available through the parallel hybrid transmission of the instant invention. During braking events, the electric motor is operated as a generator to charge the batteries. The output shaft becomes an input shaft, and kinetic energy of the vehicle that would otherwise have been lost through the brakes is stored for later use.

The first regenerative braking mode is identical to the clutch condition in motor-only mode, except that the motor is operated as a generator. In this regenerative braking mode the engine is off. The power flow is the reverse of motor-only mode. In this condition, only the generator provides braking torque.

The second regenerative braking mode is identical to the clutch condition in power-summing combination mode 1, except that the motor is operated as a generator. Both the engine and the generator provide braking torque. The power flow is the reverse of power-summing mode 1.

The third regenerative braking mode is identical to the clutch condition in power-summing combination mode 2, except that the motor is once again operated as a generator. Again, both the engine and generator provide braking torque. The power flow is the reverse of power-summing mode 2.

Finally, the fourth regenerative braking mode is identical to the direct-drive power-summing mode, except that the motor is operated as a generator. Again, both the engine and generator provide braking torque. The power flow is the reverse of power-summing mode 3.

Alternative similar hybrid transmission mechanisms may also be provided. In general, a hybrid transmission is preferably comprised of two basic planetary gear trains with four torque transfer devices and a coaxially integrated motor/generator unit. Using different combinations of the four clutches and operating the electric motor as either a motor or generator or allowing it to freewheel in the off condition, motor-only, power-summing, engine-only, engine charge, and regenerative braking operating modes are capable.

Having now fully set forth the preferred embodiments and certain modifications of the concept underlying the present invention, various other embodiments as well as certain variations and modifications of the embodiments herein shown and described will obviously occur to those skilled in the art upon becoming familiar with said underlying concept. It should be understood, therefore, that the invention may be practiced otherwise than as specifically set forth herein.

What is claimed is:

1. A transmission comprising:

a transmission case;

a first power source;

a second power source;

an electrical energy storage device in electrical communication with said second power source;

a compound planetary gear set;

an output shaft fixedly connected to at least a portion of said compound planetary gear set; and a plurality of torque transfer devices for selectively operatively connecting said first power source to said compound planetary gear set, and for connecting at least a portion of said planetary gear set to said transmission case, said plurality of torque transfer devices being simultaneously operable to selectively: (i) sum torque from said first and second power sources and transfer said summed torque to said output shaft; (ii) split torque from said first power source to simultaneously transfer a first portion of said split torque to said output shaft and a second portion of said split torque to said second power source; (iii) transmit torque from only a single one of said first and second power sources to said output shaft; (iv) transfer torque from said output shaft to said first and second power sources; and (v) transfer torque from said output shaft to either of said first or said second power sources independently;

said compound planetary gear set further comprising:
an input planetary gear train having a plurality of input gear train members, said input gear train members further comprising:
an input sun gear, an input ring gear, and a plurality of input planetary gears engaging said input sun gear and said input ring gear and being operatively connected to an input planetary gear carrier; and
an output planetary gear train having a plurality of output gear train members, said output gear train members further comprising:
an output sun gear, an output ring gear, and a plurality of output planetary gears engaging said output sun gear and said output ring gear and being operatively connected to an output planetary gear carrier;
wherein said input sun gear is conjoined with said output sun gear, and said input ring gear is conjoined with said output planetary gear carrier and said output shaft.

2. The transmission of claim 1, said first power source further comprising a first drive shaft, and said second power source further comprising a second drive shaft, wherein:
said first drive shaft is selectively operatively attached to said input planetary gear carrier, said input and output sun gears, and both said input planetary gear carrier and said input and output sun gears simultaneously;
said second drive shaft is fixedly attached to said input sun gear and said output sun gear.

3. The transmission of claim 1, said first power source further comprising a first drive shaft, said second power source further comprising a second drive shaft, and said plurality of torque transfer devices further comprising:
a first clutch selectively operatively connecting said first drive shaft to said input planetary gear carrier;
a second clutch selectively operatively connecting said first drive shaft to each of both said input sun gear and output sun gear;
a third clutch selectively operatively connecting said output ring gear to a transmission case; and
a fourth clutch selectively operatively connecting said input sun gear and said output sun gear to said transmission case.

4. The transmission of claim 3, wherein said third and fourth clutches comprise band clutches.

5. The transmission of claim 1, wherein said first power source comprises a heat engine, and said second power source comprises a combined electric motor and generator.

6. The transmission of claim 5, said plurality of torque transfer devices being further simultaneously operable to selectively transfer torque from said electric motor and said output shaft to said heat engine when said heat engine is in a non-operational state in order to start operation of said heat engine.

7. A transmission comprising:
a transmission case;
a first power source;
a second power source;
an electrical energy storage device in electrical communication with said second power source;
a compound planetary gear set;
an output shaft fixedly attached to at least a portion of said compound planetary gear set; and a plurality of torque transfer devices for selectively operatively connecting said first power source to said compound planetary gear set, and for connecting at least a portion of said planetary gear set to said transmission case, said plurality of torque transfer devices being simultaneously operable to selectively: (i) transfer torque only from said first power source to said output shaft; (ii) transfer torque only from said second power source to said output shaft; (iii) transfer combined torque from each of said first and second power sources to said output shaft; (iv) transfer torque from said first power source to said output shaft and said second power source to direct electrical energy from said second power source to said electrical energy storage device; (v) function simultaneously as a continuous variable transmission and charger for said electrical energy storage device; (vi) transfer torque from said output shaft to said second power source to direct electrical energy from said second power source to said electrical energy storage device; (vii) transfer torque from said output shaft to said first power source to provide engine braking; and (viii) transfer torque to said first and second power sources simultaneously;

said compound planetary gear set further comprising:
an input planetary gear train having a plurality of input gear train members, said
input gear train members further comprising:
an input sun gear, an input ring gear, and a plurality of input planetary gears engaging said input sun gear and said input ring gear and being operatively connected to an input planetary gear carrier; and
an output planetary gear train having a plurality of output gear train members, said output gear train members further comprising:
an output sun gear, an output ring gear, and a plurality of output planetary gears engaging said output sun gear and said output ring gear and being operatively connected to an output planetary gear carrier;
wherein said input sun gear is conjoined with said output sun gear, and said input ring gear is conjoined with said output planetary gear carrier.

8. The transmission of claim 7, said first power source further comprising a first drive shaft, and said second power source further comprising a second drive shaft, wherein:
said first drive shaft is selectively operatively attached to said input planetary gear carrier, said input and output sun gears, and both said input planetary gear carrier and said input and output sun gears simultaneously;
said input sun gear and said output sun gear are fixedly attached to said second drive shaft.

9. The transmission of claim 7, said first power source further comprising a first drive shaft, said second power source further comprising a second drive shaft, and said means for selectively and operatively connecting said first power source to said compound gear set and at least a portion of said compound gear set to said transmission case further comprising:
a first clutch selectively operatively connecting said first drive shaft to said input planetary gear carrier;
a second clutch selectively operatively connecting said first drive shaft to said input and output sun gears;
a third clutch selectively operatively connecting said output ring gear to a transmission case; and
a fourth clutch selectively operatively connecting said input sun gear and said output sun gear to said transmission case.

10. The transmission of claim 9, wherein said third and fourth clutches comprise band clutches.

11. The transmission of claim 7, wherein said first power source comprises a heat engine, and said second power source comprises a combined electric motor and generator.

12. The transmission of claim 11, said plurality of torque transfer devices being simultaneously operable to selectively transfer torque from said electric motor and said output shaft to said heat engine when said heat engine is in a nonoperational state in order to start operation of said heat engine.

13. A transmission comprising:

an engine having an engine drive shaft;

an electric driving mechanism selectively operable as an electric motor and as a generator, said electric driving mechanism having a motor drive shaft;

an electric energy storage device in electrical communication with said electric driving mechanism;

a compound planetary gear set, said compound planetary gear set further comprising an input planetary gear train having a plurality of input gear train members, and an output planetary gear train having a plurality of output gear train members;

an output shaft fixedly connected to at least a portion of said compound planetary gear set;

a first torque transfer device positioned to selectively operatively connect said engine drive shaft to a first input gear train member;

a second torque transfer device positioned to selectively operatively connect said engine drive shaft to a second input gear train member and first output gear train member;

a third torque transfer device positioned to selectively operatively connect said second output gear train member to a transmission case; and a fourth torque transfer device positioned to selectively operatively connect said one of each of said second input gear train member and first output gear train member to said transmission case;

wherein said first input gear train member comprises an input planetary gear carrier operatively connected to a plurality of input planetary gears, said input gear train members further comprising an input sun gear and an input ring gear, each of said input sun gear and said input ring gear engaging said plurality of input planetary gears, and said second output gear train member comprising an output ring gear, said output gear train members further comprising an output sun gear and a plurality of output planetary gears engaging said output sun gear and said output ring gear and being operatively connected to an output planetary gear carrier.

14. The transmission of claim 13, wherein said input sun gear is conjoined with said output sun gear, and said input ring gear is conjoined with said output planetary gear carrier.

15. The transmission of claim 13, wherein engaging said third clutch and disengaging said first, second, and fourth clutches, and operating said electric driving mechanism as an electric motor, transfers torque only from said electric driving mechanism to said output shaft.

16. The transmission of claim 13, wherein engaging said second and third clutches and disengaging said first and fourth clutches, and operating said electric driving mechanism as an electric motor, transfers torque from said engine and said electric driving mechanism to said output shaft.

17. The transmission of claim 13, wherein engaging said first and third clutches and disengaging said second and fourth clutches, and operating said electric driving mechanism as an electric motor, transfers torque from said engine and said electric driving mechanism to said output shaft.

18. The transmission of claim 13, wherein engaging said first and second clutches and disengaging said third and fourth clutches, and operating said electric driving mechanism as an electric motor, transfers torque from said engine and said electric driving mechanism to said output shaft.

19. The transmission of claim 13, wherein engaging said second and third clutches and disengaging said first and fourth clutches, and operating said electric driving mechanism as a generator, transfers torque from said engine to said output shaft and said electric driving mechanism.

20. The transmission of claim 13, wherein engaging said first and third clutches and disengaging said second and fourth clutches, and operating said electric driving mechanism as a generator, transfers torque from said engine to said output shaft and said electric driving mechanism.

21. The transmission of claim 13, wherein engaging said first and second clutches and disengaging said third and fourth clutches, and operating said electric driving mechanism as a generator, transfers torque from said engine to said output shaft and said electric driving mechanism.

22. The transmission of claim 13, wherein engaging said first clutch and disengaging said second, third, and fourth clutches, and operating said electric driving mechanism as a generator, transfers torque from said engine to said output shaft and said electric driving mechanism.

23. The transmission of claim 13, wherein engaging said second and third clutches and disengaging said first and fourth clutches, and not driving said electric driving mechanism, transfers torque only from said engine to said output shaft.

24. The transmission of claim 13, wherein engaging said first and third clutches and disengaging said second and fourth clutches transfers torque only from said engine to said output shaft.

25. The transmission of claim 13, wherein engaging said first and second clutches and disengaging said third and fourth clutches, and not driving said electric driving mechanism, transfers torque only from said engine to said output shaft.

26. The transmission of claim 13, wherein engaging said first and fourth clutches and disengaging said second and third clutches transfers torque only from said engine to said output shaft.

27. The transmission of claim 13, wherein engaging said second and third clutches and disengaging said first and fourth clutches, and operating said electric driving mechanism as a generator, transfers torque from said output shaft to said engine and said electric driving mechanism.

28. The transmission of claim 13, wherein engaging said first and third clutch and disengaging said second and fourth clutches, and operating said electric driving mechanism as a generator, transfers torque from said output shaft to said engine and said electric driving mechanism.

29. The transmission of claim 13, wherein engaging said first and second clutches and disengaging said third and fourth clutches, and operating said electric driving mechanism as a generator, transfers torque from said output shaft to said engine and said electric driving mechanism.

30. The transmission of claim 13, wherein engaging said third clutch and disengaging said first, second, and fourth clutches, and operating said electric driving mechanism as a generator, transfers torque from said output shaft only to said electric driving mechanism.

* * * * *